United States Patent [19]

Schlosser et al.

[11] Patent Number: 4,535,749
[45] Date of Patent: Aug. 20, 1985

[54] PORTABLE BARBECUE GRILL

[75] Inventors: Erich J. Schlosser, Lindenhurst; James C. Stephen, Arlington Heights, both of Ill.

[73] Assignee: Weber-Stephen Products Co., Palatine, Ill.

[21] Appl. No.: 639,951

[22] Filed: Aug. 10, 1984

[51] Int. Cl.³ .............................. F24C 5/04
[52] U.S. Cl. .................. 126/25 R; 126/9 R; 126/38
[58] Field of Search ............ 126/25 R, 25 C, 15 R, 126/9 R, 38, 37 B, 52, 287, 332, 336, 333, 337; 110/158, 157, 174, 175 A, 175 R

[56] References Cited

U.S. PATENT DOCUMENTS

| 353,147 | 11/1886 | Lederle | 126/266 X |
|---|---|---|---|
| 1,045,857 | 12/1912 | Krzewinski | 126/266 |
| 2,174,824 | 10/1939 | Frank | 126/266 |
| 2,976,390 | 3/1961 | Stemp | 126/266 X |
| 3,359,963 | 12/1967 | Kostial | 126/9 R |
| 3,452,736 | 7/1969 | Harff et al. | 126/9 R X |
| 3,556,076 | 1/1971 | Stewart | 126/9 R |
| 3,611,915 | 10/1971 | Glaser | 126/25 R X |
| 3,753,431 | 8/1973 | Koziol | 126/38 |
| 3,913,557 | 10/1975 | Ewanika et al. | 126/38 X |

Primary Examiner—Larry Jones
Attorney, Agent, or Firm—Robert E. Wagner; Ralph R. Rath

[57] ABSTRACT

A barbecue grill includes a bowl and a cover each having vents with the cover having a cover and the unit having the locking bar that locks with the gripping handle in a closed position. The locking bar has vent closures that close the vents in the bowl in a closed position. The bowl is supported by three U-shaped legs identical in construction that are secured to the bowl by fasteners and the fasteners provide support points for a fuel support grid within the bowl.

12 Claims, 6 Drawing Figures

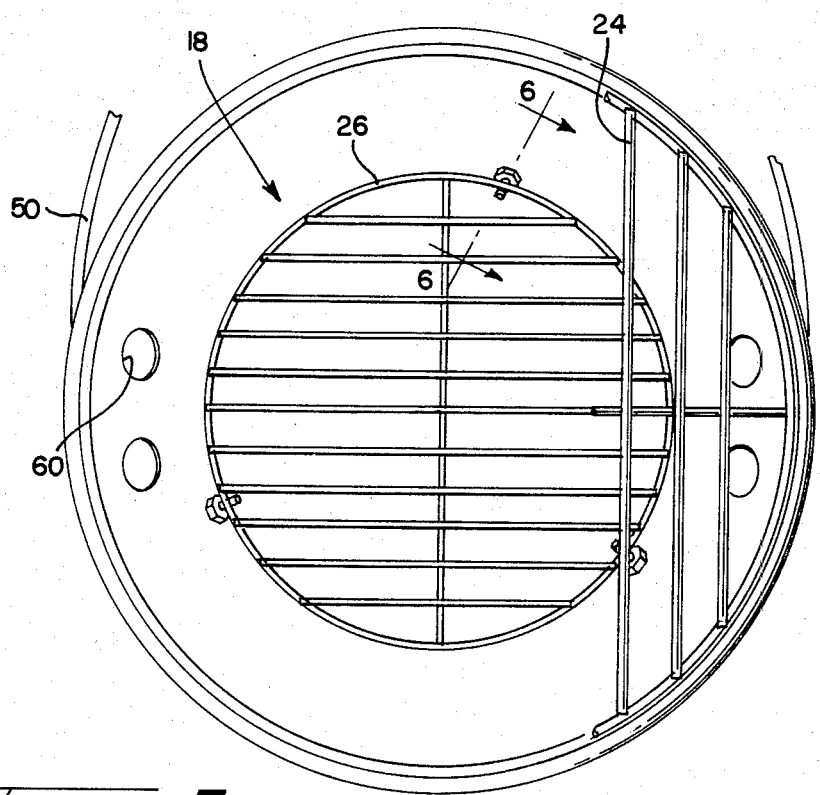
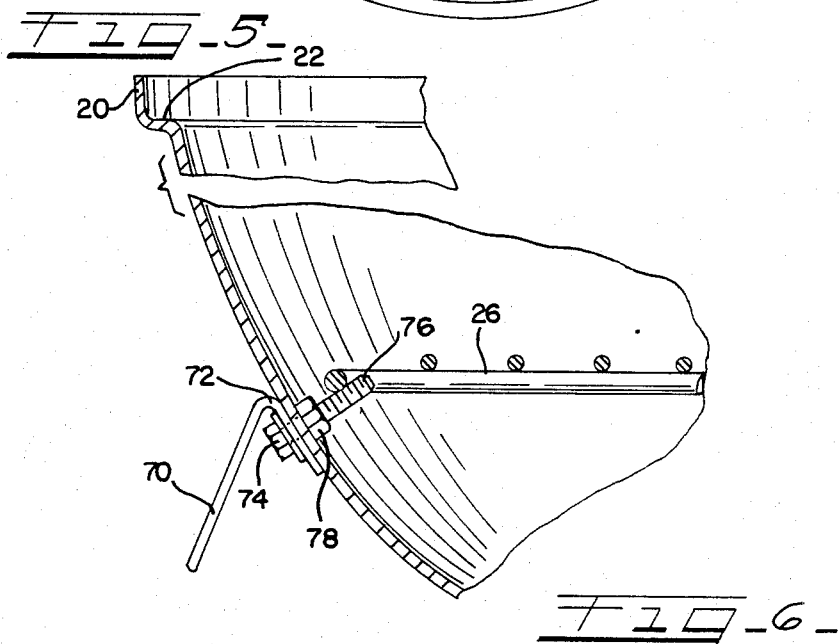

PORTABLE BARBECUE GRILL

DESCRIPTION

1. Technical Field

The present invention relates generally to cooking apparatus and, more particularly, to a portable outdoor grill having a carrying handle.

2. Background Prior Art

Outdoor cooking has become more and more popular, and various types of apparatus have been developed for this purpose. One such type of cooking apparatus is sold by the Assignee of the present invention and consists of a generally semi-hemispherical vessel or bowl that has a generally semi-hemispherical cover which is retained on the bowl or body through a lip and flange arrangement. The vessel or body has a lower solid fuel grid supported therein upon which solid fuel can be placed and a second grill or grid located adjacent the opening to support the food that is to be cooked. This type of unit has vent openings adjacent the bottom of the bowl and also in the cover to provide air for fuel and ashes produced during the cooking process are collected in the lower part of the bowl and pass through the vent openings where they are collected on an ash catcher that is supported on the support structure below the bowl. The cooking apparatus described above incorporates a tripod support arrangement which has a pair of wheels so that the unit can easily be moved about on a deck or patio.

The grill described above has been manufactured for a number of years and is very easy to assemble without the need for any special tools. However, in more recent years, the need has arisen for a more portable type of unit that can easily be carried about for use on camping trips and other short-term uses where it becomes necessary to assemble and disassemble the unit in a short period of time, and also be capable of transporting the unit small distances while the coals are still burning.

In this environment, the surroundings many times make it desirable to accumulate the ashes in the bowl until after the unit has completely cooled to prevent fires when being used in wooded areas.

Because of the competitive nature of this product, manufacturers are constantly striving to reduce the costs of manufacturing while still maintaining the various desirable features incorporated into a grill such as the above, which has found a remarkable degree of commercial success.

SUMMARY OF THE INVENTION

According to the present invention, a portable barbecue grill unit includes a grill body or bowl that has an open top surrounded by a rim with a cover adapted to be sealed on the rim and having a gripping handle with the bowl and cover having vent openings.

According to one aspect of the invention, the vent openings in the bowl are located substantially above the lower edge so that ashes can be accumulated in the bowl and the bowl has a locking bar which also supports the vent closures to automatically close the vents when the locking bar is in a carrying position. The locking bar or carrying handle also locks the cover to the bowl in the carrying position so that the entire unit can be moved about while the coals are burning and can also be substantially sealed to save unused coals for future use.

In the specific embodiment illustrated, the carrying handle or locking bar includes a generally C-shaped bar that has opposite ends pivotally supported on diametrically-opposed pivot points on the bowl, with the vent openings located around the respective pivot points and vent closures carried by the carrying handle to automatically cover the vent openings when the carrying handle is in a locked position. The carrying handle cooperates with the gripping handle on the cover to define the carrying position, which is also the closed position for the grill. For this purpose, the gripping handle on the cover has an elongated recess in an exposed surface which receives the carrying handle to define the carrying position for the unit.

According to a further aspect of the invention, the barbecue grill unit also has novel support means which again is a simplified construction that can easily be assembled. The support means is in the form of a plurality of identical legs that extend below the grill body with each leg being generally U-shaped and having one end interconnected below the center of the bowl. The opposite ends of the legs have a flange abutting an outside surface of the grill body with fastener elements extending through the flanges of the legs and through the body and terminating inwardly of the inside surface of the grill body. Thus, the fastener elements provide support points that are circumferentially spaced around the inner surface of the grill body and support a grid for use in supporting solid fuel, such as charcoal.

BRIEF DESCRIPTION OF SEVERAL VIEWS OF DRAWINGS

FIG. 5 is a plan view of the grill unit with the cover removed; and,

FIG. 6 is a fragmentary cross-sectional view as viewed along line 6—6 of FIG. 5.

DETAILED DESCRIPTION

Figure 1:
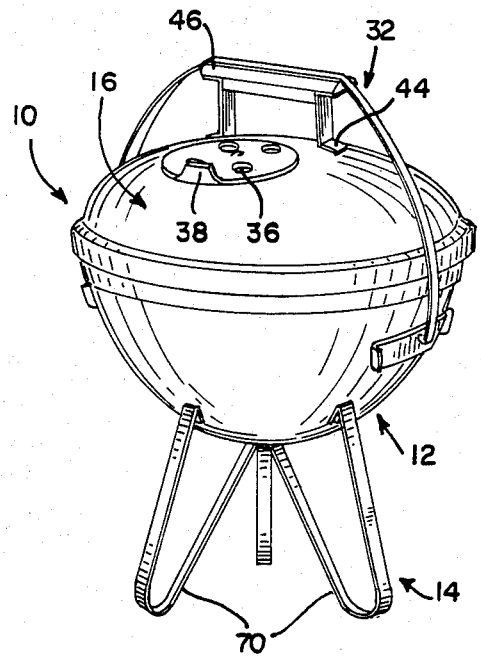
FIG. 1 shows a perspective view of the grill constructed in accordance with the teachings of the present invention.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

FIG. 1 of the drawings discloses a cooking apparatus or barbecue grill unit that is generally designated by reference numeral 10 and consists of a bowl generally designated by reference numeral 12 supported on a support, generally designated by reference numeral 14, and a cover 16.

The bowl or grill body 12 is generally semi-hemispherical in cross-section and has an open top to define a fire chamber 18 therein. A generally offset rim or lip 20 surrounds the open top of the bowl or grill body and produces a generally flat ledge 22 around the opening which is utilized to support a food grid 24, as shown in FIG. 5. The bowl 12 also supports a solid fuel grid 26 that is located below the grid 24 and is supported in a manner to be described later.

Figure 2:
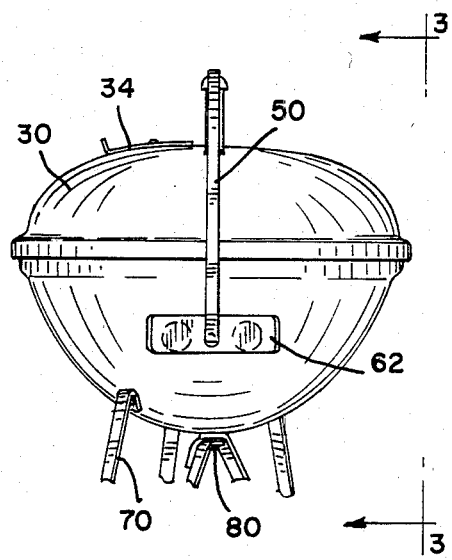
FIG. 2 is a side view of the unit shown in FIG. 1 with the carrying handle in a closed position.
Figure 3:
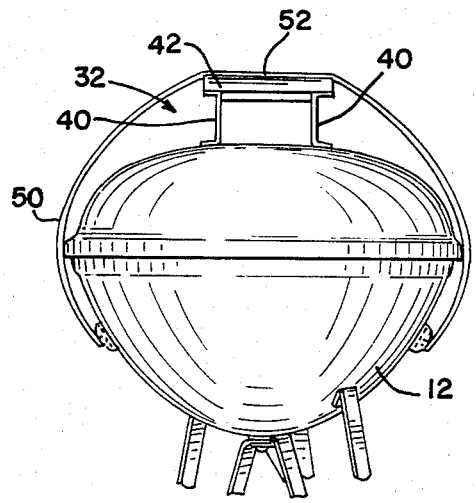
FIG. 3 is a side view as viewed along line 3—3 of FIG. 2.

The cover 16 includes a generally semi-hemispherical body 30 (FIG. 2) that has a peripherally-offset lower flange 32 which is received over the rim 20 to close and substantially seal the bowl 12 when in the closed position, illustrated in FIG. 2. The cover also has a gripping handle 32 and a plurality of vent openings (not shown) that are adapted to be opened and closed by a rotatable vent closure 34 that has openings 36 that correspond to the vent openings (not shown). The vent closure 36 also has a gripping projection 38 that can be utilized for pivoting the closure between open and closed positions, as is customary in this type of unit.

Figure 4:
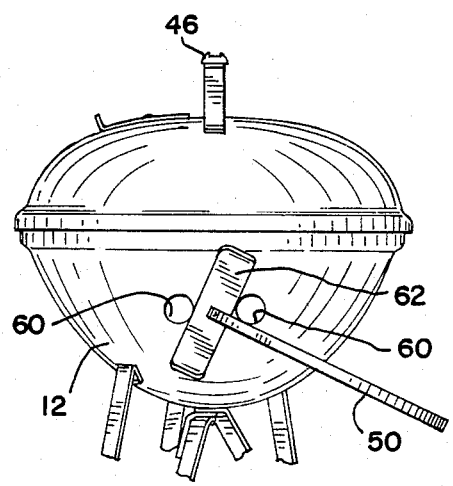
FIG. 4 is a view similar to FIG. 2 showing the carrying handle in a second or unlocked position.

The gripping handle 32 is generally U-shaped in side elevational view, as shown in FIG. 4, and includes a pair of spaced, generally U-shaped support members 40 interconnected at the top by a gripping member 42. The support members 40 have generally outwardly-directed flanges 44 (FIG. 1) on the lower end thereof, which are secured to the cover 16 by welding or other suitable securing means. The upper gripping member 42, in present commercial units, generally has an elongated, generally flat recess 46 (FIG. 4) extending from the exposed upper surface thereof and the recess has the manufacturer's product identification mark therein. Thus, the handle 32 can be produced by molding the gripping member or base 42 from a plastic material with the product identification mark molded therein and exposed on the upper surface of the handle, while the legs or support elements 40 can be formed from a metallic material and can be secured to the upper member 42 by screws or other fasteners and the lower flanges 44 welded to the cover. The unit so far shown is similar to various types of units that are presently being marketed by the Assignee of the present invention.

According to the present invention, the cooking unit 10 also incorporates a carrying handle which can be utilized to secure and lock the cover 16 to the bowl 12 while the unit is being stored and transported, and at the same time the carrying handle doubles as a vent closure for vents that are normally incorporated into the bowl 12.

Thus, as shown in FIGS. 2 and 4, a generally C-shaped carrying or locking handle 50 consists of a bar or rod that has opposite ends that are angularly related to produce inwardly-directed projections on the opposite ends of the locking bar 50. The opposite ends of the bar 50 are received into openings (not shown) that are located at diametrically-opposed points on the bowl 12 and define fixed pivot points for the locking bar 50. The central portion of the locking bar or carrying handle 50 has a generally flattened portion 52 which corresponds in length to the length of the gripping member 42 forming part of the gripping handle 32.

Thus, the carrying handle or locking bar can be pivoted from a first locked position (illustrated in FIG. 2) to a second open position (illustrated in FIG. 4). In the first locking position illustrated in FIG. 2, the center portion or flattened portion 52 of the locking bar 50 is received into the recess 46 defined on the gripping member 42 to lock the cover onto the bowl 12 and the gripping member 42 becomes the element that can be grasped to transport the unit in the closed position. If desired, the ends of recess 46 can be rounded to more readily conform to the locking handle or bar 50.

According to a further aspect of the present invention, the locking bar 50 also defines the vent closures for vents that are produced in the bowl 12. As shown in FIGS. 2 and 4, a plurality of vent openings 60 surround each of the holes (not shown) that define the pivot points for the locking bar 50 and the locking bar 50 has a closure plate in the form of a generally elongated, rectangular plate 62 movable therewith. In the illustrated embodiment, two vent openings 60 are respectively located on opposite sides of each of the pivot points for the locking bar and are equally spaced therefrom so that a single elongated, rectangular plate 62 can be utilized for providing the vent closure when the unit is in a stored or closed position.

In actual practice, the vent closure 62 can be telescoped over the end of the carrying handle and, if the carrying handle is a rectangular bar, can have a corresponding opening to prevent relative rotation between the two members. If the carrying handle 50 is a circular rod, the closure 62 could be spot welded thereto or, in the alternative, the ends of the carrying handle could have flattened portions or dimples provided for preventing the relative rotation.

In the actual construction of the unit as presently envisioned, a washer is first telescoped over the ends of the carrying handle and the vent closure plate 62 is then telescoped thereon. If desired, a further washer could be provided for the inner surface of the vent closure. However, in order to provide a more proper seal for the vent openings 60, the inner washer is preferably eliminated.

According to a further aspect of the invention, the support structure 14 again is an extremely simplified construction which can easily be manufactured utilizing a plurality of identical components, which can easily be assembled with a minimum amount of tools and the support structure also doubles as a support for the grid 26, as will be described later. Thus, as illustrated in FIGS. 1 and 6, the support structure 14 consists of three identical legs 70 that are generally U-shaped and have flattened flanges 72 at opposite ends. The flattened flange 72 at one end of the legs 70 has an opening which is adapted to be aligned with an opening in the bowl or grill body 12 and receives a fastener element 74, such as a bolt. As illustrated in FIG. 6, the fastener element or bolt 74 extends through openings in the flange 72 and in the bowl 12 and has its inner end 76 spaced from the inner surface of the bowl with a nut 78 received thereon. Thus, the inner end portion 76 of the fastener element 74 acts as a support point for the grid 26. Since there are three identical legs 70, equally circumferentially spaced around the perimeter of the bowl and have the fasteners 74 located on a common horizontal plane, the three support points will be provided for the grid 26 without any modification of the bowl construction or the provision of additional protrusions, etc.

The flanges 74 on the opposite ends of the legs 70 are placed in overlapping relation to each other at a point aligned with the center vertical axis of the bowl 12 (FIG. 2) and connected to each other by a fastener 80 extending through openings (not shown) in the flanges and the bowl.

With the above construction, the locking bar 50 in the first closed position illustrated in FIG. 2 locks and seals the cover to the bowl and at the same time seals the vent openings 60. In this position, the gripping member 42 can be used to carry the unit with hot coals therein. When the locking bar 50 is moved to the second open position, illustrated in FIG. 4, vent openings 60 are automatically uncovered and the cover 16 is released for removal. In this position, the locking bar 50 is below the open top of the bowl in an unobstructive position.

Various modifications can be made without departing from the spirit of the invention. For example, the three legs need only be interconnected to each other without a further connection to the bowl. With this arrangement, the legs could be overlapped for shipment and storage and could easily be assembled when needed.

It should also be noted that the locking bar could be used without the vent opening and vent closure arrangement described above, and could also be incorporated into different grill units having other types of support means. For example, in certain instances, the grid 26 could be supported on a ledge similar to ledge 22 formed directly in the bowl below the open top.

It should further be noted that the vent closure movement associated with the locking bar need not be restricted to concurrent movement and could be rotatable relative to the locking bar independently of movement of the locking bar but could still be supported on the ends of the locking bar.

We claim:

1. A portable barbecue grill unit comprising a grill body defining an open top fire chamber having vent openings below said top, a cover for closing said fire chamber, vent closures for said vent openings and a carrying handle for said unit, the improvement of said carrying handle being pivoted on said body and having said vent closures secured thereto and movable therewith, said carrying handle having a first position locking said cover on said body with said vent closures covering said vent openings in said position and a second position where said cover is removable and said vent openings are uncovered.

2. A portable barbecue grill unit as defined in claim 1, in which said grill body is generally semi-hemispherical and said carrying handle is pivotably supported at diametrically-opposed locations thereon about fixed pivot points.

3. A portable barbecue grill unit as defined in claim 2, in which there are a plurality of vent openings surrounding each pivot point, said vent closures being movable with said carrying handle to open and close each vent opening.

4. A portable barbecue grill unit as defined in claim 3, in which there are two vent openings adjacent each pivot point and respectively located on opposite sides of said pivot points and in which said vent closures include first and second plates adjacent opposite ends of said carrying handle with each plate adapted to simultaneously cover two vent openings adjacent a pivot point.

5. A portable barbecue grill unit as defined in claim 2, further including a plurality of legs extending below said grill body with each leg being generally U-shaped and having one end connected to each other below a central location of said grill body and opposite ends of each leg having flanges abutting an outside surface of said grill body at circumferentially-spaced locations and fastener elements extending through said flanges and said grill body and terminating inwardly of said main body to define support points for a solid fuel grid within said main body.

6. A portable barbecue grill unit as defined in claim 1, in which said cover has a gripping handle and said carrying handle includes a bar extending across said gripping handle in said first position.

7. A portable barbecue grill unit as defined in claim 6, in which said gripping handle has a recess extending from an exposed surface with said bar received into said recess in said first position.

8. A portable barbecue grill comprising a generally semi-hemishperical bowl having an open top with said bowl having support means thereon and a cover for said open top, said cover having a generally U-shaped gripping handle with a base and a pair of spaced legs secured to said cover, the improvement of a locking bar having opposite ends pivoted about diametrically-opposed fixed pivots on said bowl and having an open position located below said open top and a locked position wherein said locking bar extends across the base to lock said cover to said bowl, said base of said gripping handle having a recess receiving said locking bar in said locked position so that said gripping handle on said cover can be grasped when said locking bar is in said locked position to transport said grill.

9. A portable barbecue grill as defined in claim 8, in which said bowl has vent openings around said fixed pivots and said locking bar has vent closures covering said vent openings in said locked position and exposing said vent openings in said open position.

10. A portable barbecue grill unit as defined in claim 8, in which said support means includes three substantially identical U-shaped legs having one end connected to each other below a center portion of said bowl and having opposite ends engaging an outer surface of said bowl at circumferentially-spaced locations with fastener means extending through said opposite ends and said bowl and terminating inwardly of an inner surface of said bowl to define circumferentially-spaced support points for a grid in said bowl.

11. A portable barbecue grill as defined in claim 8, in which said bowl has vent openings around said fixed pivots and said locking bar has vent closures rotatable on said opposite ends for covering and exposing said vent openings.

12. A portable barbecue grill unit comprising a grill body defining an open top fire chamber having vent openings below said top, a cover for closing said fire chamber, vent closures for said vent openings and a carrying handle for said unit, the improvement of said carrying handle having opposite ends pivotally attached on opposite sides to said body and said handle having a first position locking said cover on said body and a second position where said cover is removable, said vent closures being supported on said opposite ends of said carrying handle adjacent said vent openings and being rotatable thereon to open and close said vent openings.

* * * * *